US012661667B2

(12) United States Patent
Lee et al.

(10) Patent No.: US 12,661,667 B2
(45) Date of Patent: Jun. 23, 2026

(54) TREATMENT LIQUID SPRAY NOZZLE

(71) Applicant: DEVICE CO., LTD., Cheonan-si (KR)

(72) Inventors: Taek Youb Lee, Cheonan-si (KR); Jun Hwan Lee, Cheonan-si (KR)

(73) Assignee: DEVICE CO., LTD, Chungcheongnam-do (KR)

( * ) Notice: Subject to any disclaimer, the term of this patent is extended or adjusted under 35 U.S.C. 154(b) by 254 days.

(21) Appl. No.: 18/423,913

(22) Filed: Jan. 26, 2024

(65) Prior Publication Data

US 2025/0083160 A1 Mar. 13, 2025

(30) Foreign Application Priority Data

Sep. 7, 2023 (KR) ........................ 10-2023-0119114

(51) Int. Cl.
*B05B 1/34* (2006.01)
*B05B 7/04* (2006.01)

(52) U.S. Cl.
CPC ............ *B05B 1/341* (2013.01); *B05B 7/0408* (2013.01)

(58) Field of Classification Search
CPC ......... B05B 1/34; B05B 1/341; B05B 1/3415; B05B 1/3431; B05B 1/3442; B05B 1/3402; B05B 7/04; B05B 7/0408; B05B 7/0483; B05B 7/0416; B05B 7/10; B01F 25/10; B01F 25/25; B01F 25/434; B01F 25/4341
See application file for complete search history.

(56) References Cited

U.S. PATENT DOCUMENTS

| | | | | |
|---|---|---|---|---|
| 5,603,453 | A * | 2/1997 | Weaver | B05B 7/0892 239/432 |
| 10,758,875 | B2 | 9/2020 | Bang et al. | |
| 2011/0220286 | A1 * | 9/2011 | Park | B01F 25/10 137/602 |
| 2013/0256429 | A1 * | 10/2013 | Kobayashi | F02M 61/163 239/488 |
| 2018/0185795 | A1 * | 7/2018 | Bang | H01L 21/67051 |

FOREIGN PATENT DOCUMENTS

| | | | |
|---|---|---|---|
| KR | 1020110000228 | A | 1/2011 |
| KR | 1020110057679 | A | 6/2011 |
| KR | 1020180051871 | A | 5/2018 |

* cited by examiner

*Primary Examiner* — Tuongminh N Pham
(74) *Attorney, Agent, or Firm* — BLANK ROME LLP

(57) ABSTRACT

The present disclosure relates to a treatment liquid spray nozzle including: a body having a mixing space portion formed therein to mix a first treatment liquid and a second treatment liquid, a first inlet formed on top thereof in such a way as to communicate with the mixing space portion to allow the first treatment liquid to flow into the mixing space portion, a second inlet formed on the side peripheral surface thereof in such a way as to communicate with the mixing space portion to allow the second treatment liquid to flow into the mixing space portion, and a spray hole formed on the bottom thereof in such a way as to communicate with the mixing space portion; and a rotational flow guiding part disposed in the mixing space portion in such a way as to allow both ends thereof to face the first inlet and the spray hole.

9 Claims, 5 Drawing Sheets

TREATMENT LIQUID SPRAY NOZZLE

CROSS REFERENCE TO RELATED APPLICATION OF THE DISCLOSURE

The present application claims the benefit of Korean Patent Application No. 10-2023-0119114 filed in the Korean Intellectual Property Office on Sep. 7, 2023, the entire contents of which are incorporated herein by reference.

BACKGROUND OF THE DISCLOSURE

Field of the Disclosure

The present disclosure relates to a treatment liquid spray nozzle, more specifically to a treatment liquid spray nozzle for a substrate treatment apparatus that is capable of mixing two or more treatment liquids to spray the mixed treatment liquids onto a substrate.

Background of the Related Art

Generally, a substrate treatment apparatus is an apparatus that performs, with the use of treatment liquids, various processes such as deposition, photolithography, etching, and cleaning for substrates such as semiconductor wafers, substrate for display, optical disk substrates, magnetic disk substrates, photomask substrates, ceramic substrates, solar cell substrates, and the like.

Among the processes, the cleaning process is performed to remove foreign substances or particles from the substrate, and representatively, a treatment liquid is supplied to top or underside of a substrate to perform the cleaning process for the substrate, while the substrate is rotating at a high speed in a state of being supportably placed on top of a chuck base (spin head).

A representative example of the treatment liquids is a cleaning liquid that is used for sulfuric acid peroxide mixture (SPM) cleaning in which sulfuric acid and hydrogen peroxide are mixed in a given ratio, and in this case, sulfuric acid and hydrogen peroxide are introduced into a treatment liquid spray nozzle, independently of each other, then mixed with each other, and finally sprayed onto a substrate.

A conventional technology in which vortexes are used to smoothly mix and spray sulfuric acid and hydrogen peroxide has been disclosed, and to generate the vortexes, in this case, a treatment liquid spray nozzle is configured to rotate the sulfuric acid and hydrogen peroxide therein.

For example, the conventional treatment liquid spray nozzle is configured to have a first supply pipe and a second supply pipe located in a tangential direction with respect to the inner peripheral surface of a mixing space portion of a body and to allow sulfuric acid and hydrogen peroxide to be introduced through the first supply pipe and the second supply pipe to thus generate vortexes from the introduced sulfuric acid and hydrogen peroxide, thereby making the sulfuric acid and hydrogen peroxide mixed and sprayed smoothly.

However, even if the sulfuric acid and hydrogen peroxide are introduced into the mixing space portion in the tangential direction with respect to the inner peripheral surface of the mixing space portion, they are not mixed with each other well due to a specific gravity difference therebetween, so that when they are sprayed onto the substrate, the corresponding treatment is not uniformly performed on the entire substrate, thereby undesirably causing the substrate to be defective.

SUMMARY OF THE DISCLOSURE

Accordingly, the present disclosure has been made in view of the above-mentioned problems occurring in the related art, and it is an object of the present disclosure to provide a treatment liquid spray nozzle that is capable of mixing two or more types of treatment liquids uniformly, while overcoming a specific gravity difference thereamong, when the two or more types of treatment liquids are introduced independently of each other, mixed, and sprayed, thereby preventing a substrate from being defective due to spraying.

To accomplish the above-mentioned objects, according to the present disclosure, there is provided a treatment liquid spray nozzle including: a body having a mixing space portion formed therein to mix a first treatment liquid and a second treatment liquid, a first inlet formed on top thereof in such a way as to communicate with the mixing space portion to allow the first treatment liquid to flow into the mixing space portion, a second inlet formed on the side peripheral surface thereof in such a way as to communicate with the mixing space portion to allow the second treatment liquid to flow into the mixing space portion, and a spray hole formed on the bottom thereof in such a way as to communicate with the mixing space portion; and a rotational flow guiding part disposed in the mixing space portion in such a way as to allow both ends thereof to face the first inlet and the spray hole respectively and having a spiral guide with a spiral groove formed on the outer peripheral surface thereof.

According to the present disclosure, desirably, the spiral guide may have a circular cross-sectional shape, while having a tapered shape becoming narrower from the upper portion toward the lower portion thereof.

According to the present disclosure, desirably, above or under the spiral guide inside the mixing space portion may be disposed one or more perforated plates in a transverse direction with respect to the spray direction of the treatment liquids.

According to the present disclosure, desirably, the upper perforated plate may be located above the spiral guide, and the second inlet is formed under the upper perforated plate.

According to the present disclosure, desirably, the lower perforated plates may be located under the spiral guide, and the cross-sectional area of the mixing space portion where the lower perforated plates are located may be smaller than the cross-sectional area of the mixing space portion where the upper perforated plate is located.

According to the present disclosure, desirably, the rotational flow guiding part may further include a top coupling bar extending upward from top of the spiral guide in such a way as to be coupled to the upper perforated plate.

According to the present disclosure, desirably, the rotational flow guiding part may further include a bottom coupling bar extending downward from the underside of the spiral guide in such a way as to be coupled to at least one of the lower perforated plates.

According to the present disclosure, desirably, top of the top coupling bar may face the first inlet and become smaller in a cross-sectional area thereof.

According to the present disclosure, desirably, the body may include: a mixing body having the mixing space portion formed therein and a top opening and a bottom opening formed on top and bottom thereof respectively in such a way as to communicate with the mixing space portion; an upper cover detachably coupled to the top opening and having the first inlet penetrating up and down thereinto; and a lower cover detachably coupled to the bottom opening and having the spray hole penetrating thereinto.

According to the present disclosure, desirably, the mixing body may have one or more perforated plates detachably coupled thereto above or under the spiral guide inside the mixing space portion in a transverse direction with respect to the spray direction of the treatment liquids, and the rotational flow guiding part may be detachably coupled to at least one of the perforated plates.

According to the present disclosure, desirably, one of the perforated plate may be inserted into the bottom opening of the mixing body, and the through holes formed on the perforated plate inserted into the bottom opening may be smaller in diameter than the through holes of the perforated plates disposed on different positions therefrom.

BRIEF DESCRIPTION OF THE DRAWINGS

The above and other objects, features and advantages of the present disclosure will be apparent from the following detailed description of the embodiments of the disclosure in conjunction with the accompanying drawings, in which.

DETAILED DESCRIPTION OF THE PREFERRED EMBODIMENT

Hereinafter, an embodiment of the present disclosure will be explained in detail with reference to the attached drawings.

Figure 1:
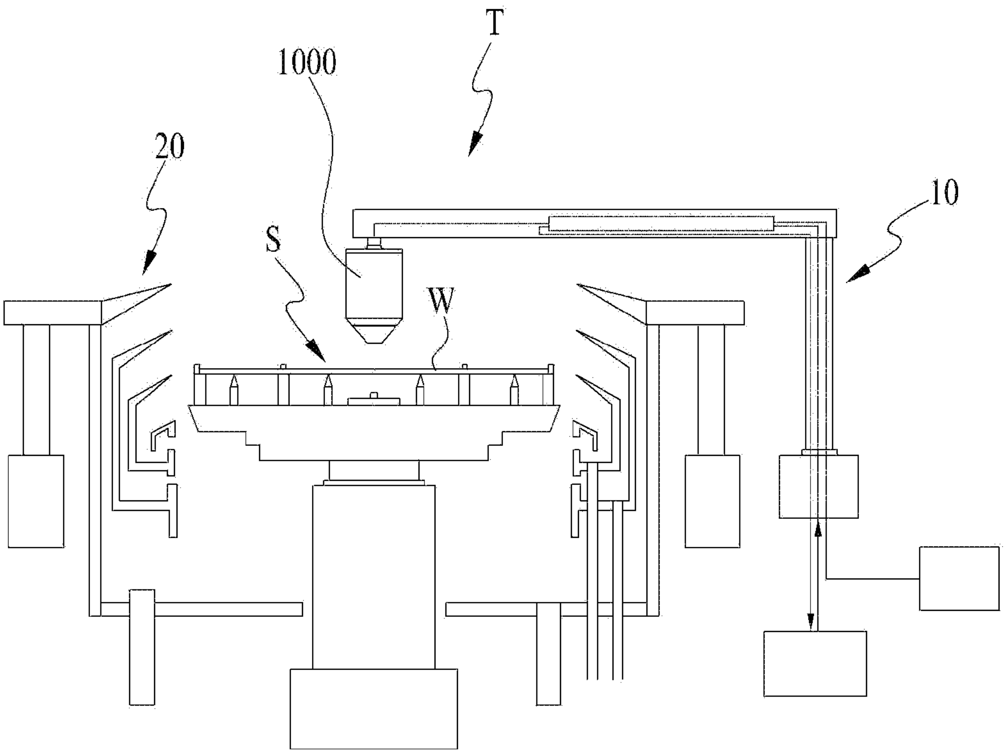
FIG. 1 is a schematic sectional view showing a substrate treatment apparatus.
Figure 2:
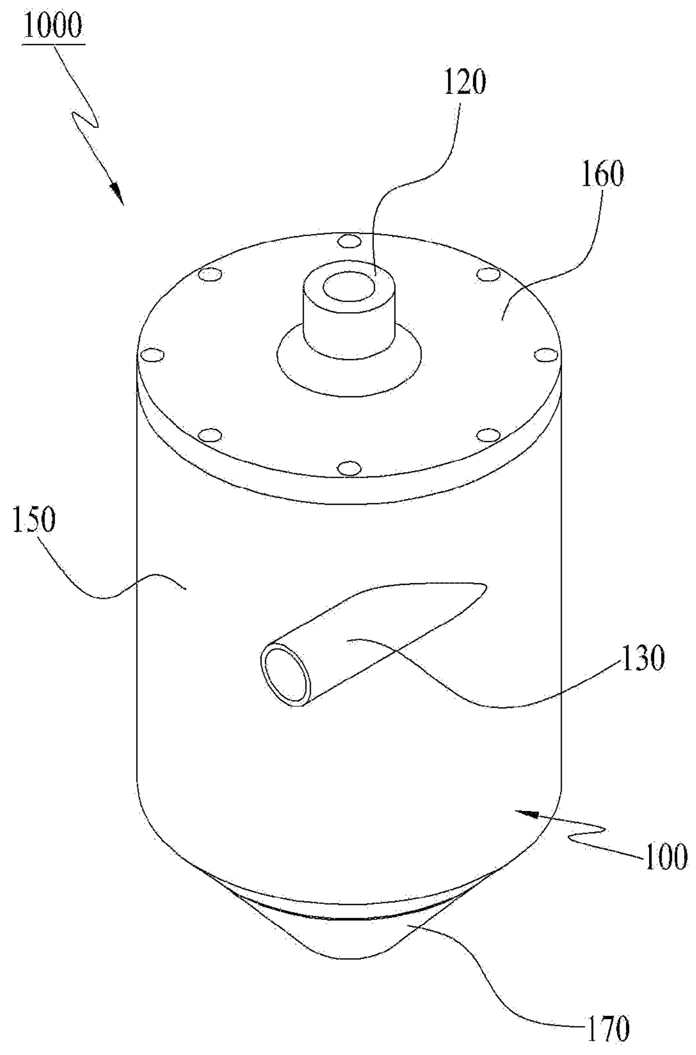
FIG. 2 is a perspective view showing a treatment liquid spray nozzle according to the present disclosure.

As shown in FIG. 1, generally, a substrate treatment apparatus T includes a treatment liquid spray unit 10, a bowl assembly 20, and a substrate support assembly S.

The treatment liquid spray unit 10 supplies treatment liquids for substrate treatments such as cleaning to a substrate W, and the substrate support assembly S serves to rotate the substrate W in a state of supporting the substrate W, while the substrate treatments are being carried out.

As shown in FIGS. 2 to 5, a treatment liquid spray nozzle 1000 according to the present disclosure includes: a body 100 having a mixing space portion 110 formed therein to mix a first treatment liquid 910 and a second treatment liquid 920, a first inlet 120 formed on top thereof in such a way as to communicate with the mixing space portion 110 to allow the first treatment liquid 910 to flow into the mixing space portion 110, a second inlet 130 formed on the side peripheral surface thereof in such a way as to communicate with the mixing space portion 110 to allow the second treatment liquid 920 to flow into the mixing space portion 110, and a spray hole 140 formed on the bottom thereof in such a way as to communicate with the mixing space portion 110; and a rotational flow guiding part 200 disposed in the mixing space portion 110 in such a way as to allow both ends thereof to face the first inlet 120 and the spray hole 140 and having a spiral guide 220 with a spiral groove 210 formed on the outer peripheral surface thereof.

Under such a configuration, the first treatment liquid 910 introduced through the first inlet 120 is sprayed onto top of the spiral guide 220 and diffused in every direction, and the second treatment liquid 920 introduced through the second inlet 130 moves in a tangential direction with respect to the inner peripheral surface of the mixing space portion 110 and rotates along the inner peripheral surface of the mixing space portion 110, so that vortexes are generated more smoothly from the first treatment liquid 910 and the second treatment liquid 920 through the spiral groove 210 of the spiral guide 220, thereby improving the mixing efficiency of the first treatment liquid 910 and the second treatment liquid 920.

That is, the first treatment liquid 910, which collides against top of the spiral guide 220 and spreads in a radial direction, meets the second treatment liquid 920 rotatingly moving along the inner peripheral surface of the mixing space portion 110, and accordingly, the first treatment liquid 910 and the second treatment liquid 920 are naturally mixed together. The mixed treatment liquids move along the spiral groove 210 of the spiral guide 220 and thus generate the vortexes, so that the treatment liquids are mixed more smoothly and uniformly and then discharged through the spray hole 140, without any hesitation.

Moreover, the spiral guide 220 has a circular cross-sectional shape, while having a tapered shape becoming narrower from the upper portion toward the lower portion thereof, so that the vortexes are more focusly generated toward the spray hole 140, thereby achieving smooth and stable spraying.

When viewed on the longitudinal sectional thereof, the spiral guide 220 has the shape of a partial cone, but of course, the spiral guide 220 may have the shape of a curved surface convex outward or concave inward.

Further, one or more perforated plates 300, 400 and 500 are disposed above or under the spiral guide 220 inside the mixing space portion 110 in a transverse direction with respect to the spray direction of the treatment liquids, and the outer peripheral surfaces of the perforated plates 300, 400 and 500 are desirably coupled to the inner peripheral surface of the mixing space portion 110.

Under such a configuration, the treatment liquids introduced into the mixing space portion 110 above the perforated plates 300, 400 and 500 are diffused and uniformly discharged by means of the perforated plates 300, 400 and 500, thereby greatly improving the mixing efficiency of the first treatment liquid 910 and the second treatment liquid 920.

For example, the upper perforated plate 300 is located above the spiral guide 220, and the second inlet 130 is formed under the upper perforated plate 300.

As a result, the first treatment liquid 910 introduced through the first inlet 120 collides against the upper perforated plate 300, distributedly spreads in a radial direction of the upper perforated plate 300, and is discharged uniformly to the spiral guide 220 through first through holes 310 formed on the upper perforated plate 300, so that the discharged first treatment liquid 910 is mixed with the second treatment liquid 920 introduced through the second inlet 130 and moves to the spray hole 140, while generating the vortexes.

That is, the first treatment liquid 910 such as sulfuric acid is discharged uniformly through the perforated structure of the upper perforated plate 300 in a downward direction and then mixed smoothly with the second treatment liquid 920 such as hydrogen peroxide introduced under the upper perforated plate 300, and in this case, the vortexes are generated by means of the spiral guide 220, so that the first treatment liquid 910 and the second treatment liquid 920 move, while being mixed with each other more smoothly.

The rotational flow guiding part 200 further includes a top coupling bar 230 extending upward from top of the spiral guide 220 in such a way as to be coupled to the upper perforated plate 300.

As a result, a coupling structure for simultaneously obtaining the mixing effect through the spiral guide 220 and the uniform distribution and discharge effect through the upper perforated plate 300 is more compactedly made.

In this case, the top coupling bar 230 is formed integrally with the upper perforated plate 300 or separably coupled to the upper perforated plate 300.

If the top coupling bar 230 is separably coupled to the upper perforated plate 300, the rotational flow guiding part 200 is rotatably or fixedly coupled to the upper perforated plate 300.

Further, top of the top coupling bar 230 faces the first inlet 120 and becomes smaller in a cross-sectional area thereof, so that the first treatment liquid 910 introduced through the first inlet 120 smoothly spreads in the radial direction of the upper perforated plate 300.

Further, the lower perforated plates 400 and 500 are located under the spiral guide 220, and the cross-sectional area of the mixing space portion 110 where the lower perforated plates 400 and 500 are located are smaller than that of the mixing space portion 110 where the upper perforated plate 300 is located.

In the drawings, the upper perforated plate 300 is disposed in a first space portion 111, and the lower perforated plates 400 and 500 are disposed correspondingly in a second space portion 112 and a third space portion 113. Diameters of the first to third space portions 111 to 113, which represent cross-sectional areas for the flow of the treatment liquids, are denoted by D1, D2, and D3.

The diameter D3 of the third space portion 113 is smaller than the diameter D2 of the second space portion 112, so that the cross-sectional areas for the flow of the treatment liquids are gradually smaller from the first inlet 120 to the spray hole 140.

Under the configuration where the cross-sectional areas for the flow of the treatment liquids are gradually reduced, the first treatment liquid 910 and the second treatment liquid 920 are more perfectly mixed and more stably discharged.

That is, the treatment liquids are introduced from a relatively large space portion into a relatively narrow space portion, so that they come into tight contact with each other, thereby improving their mixing effect.

Like the upper perforated plate 300, the lower perforated plates 400 and 500 have second through holes 410 and third through holes 510, thereby uniformly discharging the first treatment liquid 910 and the second treatment liquid 920 mixed with each other.

The rotational flow guiding part 200 further includes a bottom coupling bar 240 extending downward from the underside of the spiral guide 220 in such a way as to be coupled to at least one of the lower perforated plates 400 and 500. In the drawings, the bottom coupling bar 240 is coupled to the lower perforated plate 400 located relatively higher than the lower perforated plate 500.

The top coupling bar 230 and the bottom coupling bar 240 are coupled correspondingly to the upper perforated plate 300 and the lower perforated plate 400 respectively, and accordingly, only if the upper perforated plate 300 and the lower perforated plate 400 are firmly coupled to the interior of the mixing space portion 110 of the body 100, the rotational flow guiding part 200 is strongly coupled to the body 100, without any movement.

As a result, a coupling structure for simultaneously obtaining the mixing effect through the spiral guide 220 and the uniform distribution and discharge effect through the lower perforated plate 400 is more compactedly made.

The first space portion 111, the second space portion 112, and the third space portion 113 each have a circular cross-sectional shape so that upward and downward flow as well as peripheral flow of the treatment liquids are achieved smoothly.

Like this, the first treatment liquid 910 and the second treatment liquid 920 uniformly flow and mix with each other efficiently by means of the first space portion 111, the second space portion 112, and the third space portion 113 whose cross-sectional areas for the flow of the treatment liquids are reduced sequentially and the perforated plates 300, 400, and 500 located in the respective space portions, so that the discharging (spraying) through the spray hole 140 is more stably achieved to allow the substrate treatment to be performed uniformly over the entire area of the substrate.

Further, the above-mentioned components are separably coupled to one another so that some of them are changed in shape and combined to one another according to the types of treatment liquids or the types of substrate treatment apparatuses.

For example, the body 100 includes a mixing body 150 having the mixing space portion 110 formed therein and a top opening 151 and a bottom opening 152 formed on top and bottom thereof respectively in such a way as to communicate with the mixing space portion 110, an upper cover 160 detachably coupled to the top opening 151 and having the first inlet 120 penetrating up and down thereinto, and a lower cover 170 detachably coupled to the bottom opening 152 and having the spray hole 140 penetrating thereinto.

The body 100 is configured to have the mixing body 150, the upper cover 160, and the lower cover 170 detachably coupled to one another, so that the coupling and manufacturing processes of the perforated plates 300, 400, and 500 and the rotational flow guiding part 200 are performed more easily and conveniently.

In this case, the mixing body 150 is configured to allow one or more perforated plates 300, 400 and 500 to be detachably coupled thereto above or under the spiral guide 220 inside the mixing space portion 110 in a transverse direction with respect to the spray direction of the treatment liquids.

Figure 3:
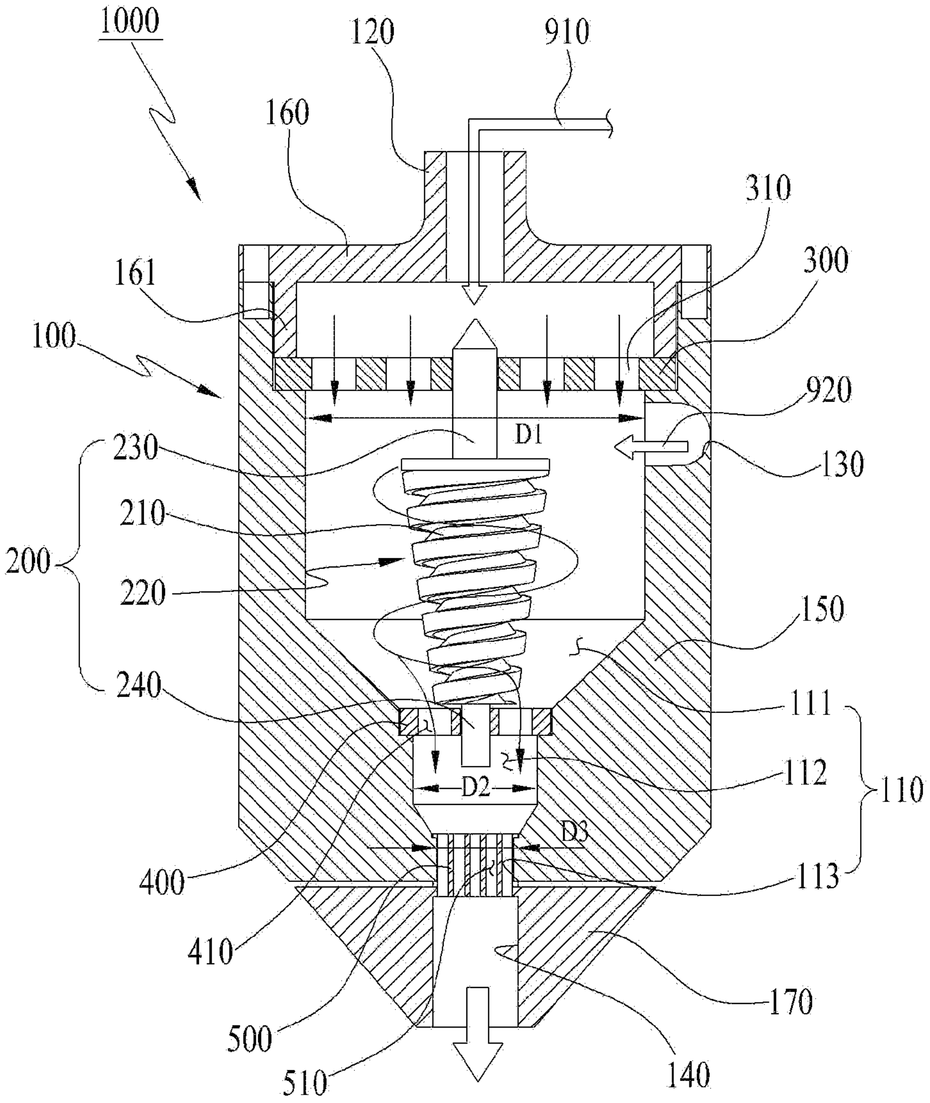
FIG. 3 is a longitudinal sectional view showing the treatment liquid spray nozzle according to the present disclosure.
Figure 4:
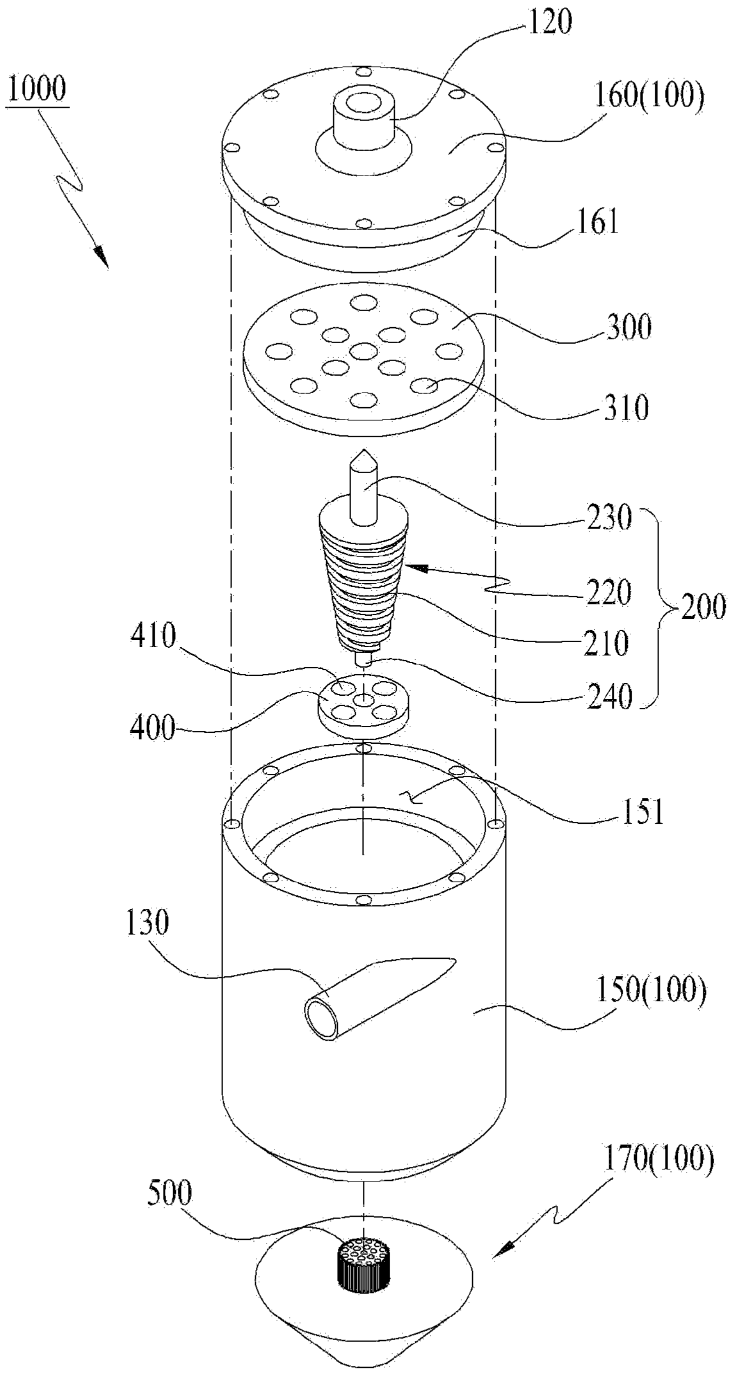
FIG. 4 is an exploded top perspective view showing the treatment liquid spray nozzle according to the present disclosure.
Figure 5:
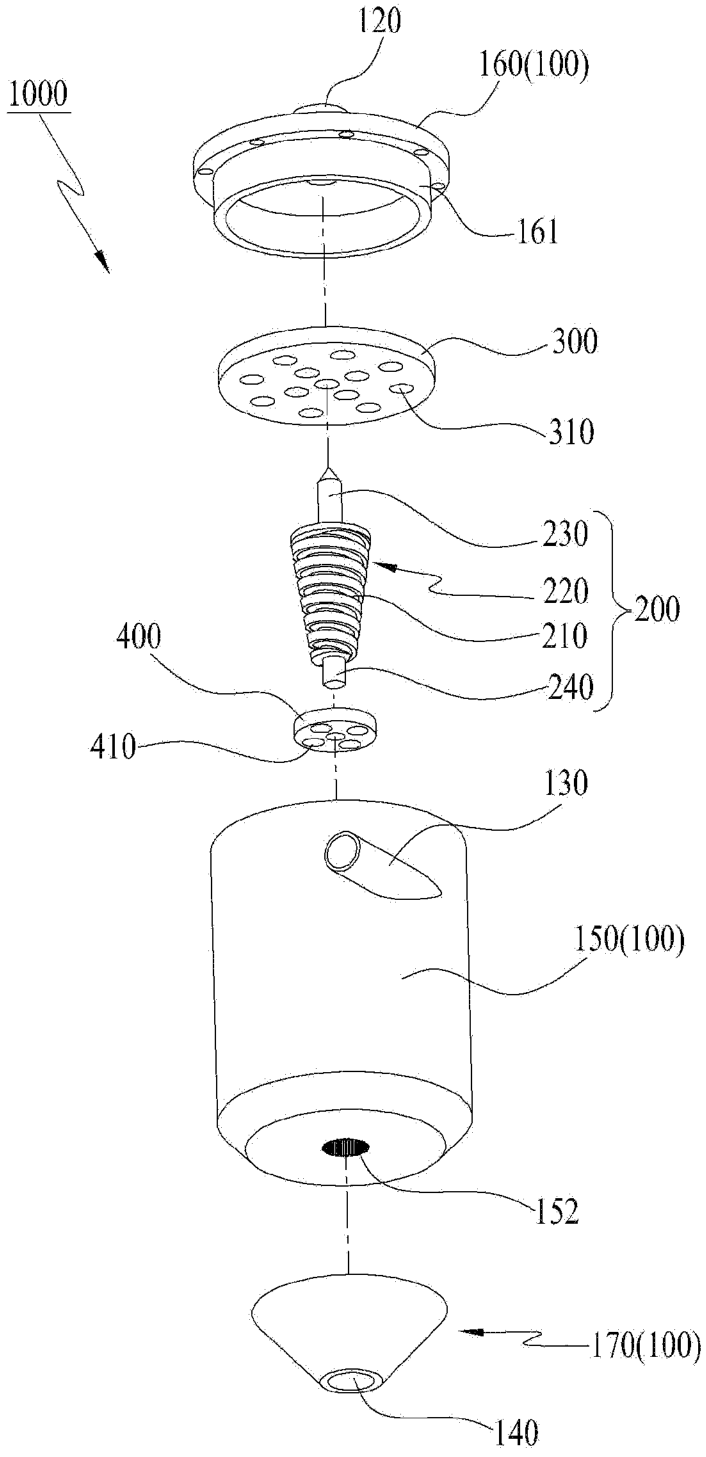
FIG. 5 is an exploded bottom perspective view showing the treatment liquid spray nozzle according to the present disclosure.

According to the embodiment of the present disclosure, as shown in FIG. 3, one upper perforated plate 300 and two lower perforated plates 400 and 500 are provided.

Further, the rotational flow guiding part 200 is detachably coupled to at least one of the perforated plates 300, 400, and 500.

According to the embodiment of the present disclosure, as shown in FIG. 3, the rotational flow guiding part 200 is detachably coupled to the upper perforated plate 300 and the lower perforated plate 400.

The lower perforated plate 500 is inserted into the bottom opening 152 of the mixing body 150, and the through holes 510 formed on the lower perforated plate 500 inserted into the bottom opening 152 are smaller in diameter than the through holes 310 and 410 of the perforated plates 300 and 400, so that the mixed treatment liquids are sprayed through the spray hole 140 more stably.

Further, the upper cover 160 has a support ring 161 extending downward therefrom to supportably pressurize top periphery of the upper perforated plate 300.

The lower perforated plate 500 is screw-coupled to the bottom opening 152 of the mixing body 150.

Like this, the mixing body 150, the upper cover 160 and/or the lower cover 170, the upper perforated plate 300, the lower perforated plates 400 and 500, and the spiral guide 220 are detachably coupled to one another, so that the rotational flow guiding part 200, the upper perforated plate 300, and the lower perforated plates 400 and 500 are freely combined to one another, thereby making it possible to select and apply an optimal combination among the combinations according to treatment processes.

For example, a length or shape of the spiral guide 220, an inclined angle or cross-sectional area of the spiral groove 210, the diameters of the through holes formed on the perforated plates 300, 400, and 500, the number of through holes, and the distributed arrangements of the through holes may be freely combined to one another.

As described above, the treatment liquid spray nozzle according to the present disclosure is configured to have the body with the mixing space portion formed therein to mix a first treatment liquid and a second treatment liquid, the first inlet formed on top thereof in such a way as to communicate with the mixing space portion to allow the first treatment liquid to flow into the mixing space portion, the second inlet formed on the side peripheral surface thereof in such a way as to communicate with the mixing space portion to allow the second treatment liquid to flow into the mixing space portion, and the spray hole formed on the bottom thereof in such a way as to communicate with the mixing space portion, and the rotational flow guiding part disposed in the mixing space portion in such a way as to allow both ends thereof to face the first inlet and the spray hole respectively and having the spiral guide with the spiral groove formed on the outer peripheral surface thereof, wherein the first treatment liquid, which collides against top of the spiral guide and spreads in a radial direction, meets the second treatment liquid rotatingly moving along the inner peripheral surface of the mixing space portion, and accordingly, the first treatment liquid and the second treatment liquid are naturally mixed together, move along the spiral groove of the spiral guide, and thus generate the vortexes, so that the treatment liquids are mixed more smoothly and uniformly and then discharged through the spray hole, without any difficulty.

According to the present disclosure, further, the treatment liquid spray nozzle is configured to allow the spiral guide to have a circular cross-sectional shape, while having a tapered shape becoming narrower from the upper portion toward the lower portion thereof, so that the vortexes are more collectively generated toward the spray hole, thereby achieving smooth and stable spraying.

According to the present disclosure, moreover, the treatment liquid spray nozzle is configured to allow one or more perforated plates to be disposed above or under the spiral guide inside the mixing space portion in a transverse direction with respect to the spray direction of the treatment liquids, so that the first and second treatment liquids introduced into the mixing space portion above the perforated plates are diffused and uniformly discharged by means of the perforated plates, thereby greatly improving the mixing efficiency of the first and second treatment liquids.

According to the present disclosure, further, the treatment liquid spray nozzle is configured to allow the lower perforated plates to be located under the spiral guide, while the cross-sectional area of the mixing space portion where the lower perforated plates are located are being smaller than that of the mixing space portion where the upper perforated plate is located, so that the first treatment liquid and the second treatment liquid are more perfectly and stably mixed and discharged.

According to the present disclosure, furthermore, the treatment liquid spray nozzle is configured to allow the rotational flow guiding part to have the top coupling bar extending upward from top of the spiral guide in such a way as to be coupled to the upper perforated plate, so that the coupling structure for simultaneously obtaining the mixing effect through the spiral guide and the uniform distribution and discharge effect through the upper perforated plate is more compactedly made.

According to the present disclosure, moreover, the treatment liquid spray nozzle is configured to allow the top of the top coupling bar to face the first inlet, while becoming smaller in a cross-sectional area thereof, so that the first treatment liquid introduced through the first inlet smoothly spreads in the radial direction and is thus mixed well with the second treatment liquid.

According to the present disclosure, also, the treatment liquid spray nozzle is configured to allow the rotational flow guiding part to have the bottom coupling bar extending downward from the underside of the spiral guide in such a way as to be coupled to the lower perforated plate, so that the coupling structure for simultaneously obtaining the mixing effect through the spiral guide and the uniform distribution and discharge effect through the lower perforated plate is more compactedly made.

According to the present disclosure, further, the treatment liquid spray nozzle is configured to allow the mixing body, the upper cover and/or the lower cover constituting the body, the upper perforated plate, the lower perforated plates, and the rotational flow guiding part to be detachably coupled to one another, so that the rotational flow guiding part, the upper perforated plate, and the lower perforated plates are freely combined to one another, thereby making it possible to select and apply an optimal combination among the combinations according to treatment processes.

According to the present disclosure, besides, the treatment liquid spray nozzle is configured to allow the body to have the mixing body, the upper cover, and the lower cover detachably coupled to one another, so that the coupling and manufacturing processes of the perforated plates and the rotational flow guiding part are performed more easily and conveniently.

According to the present disclosure, further, the treatment liquid spray nozzle is configured to allow the lower perforated plate to be inserted into the bottom opening of the mixing body and to allow the through holes formed on the lower perforated plate inserted into the bottom opening to be smaller in diameter than the through holes of the perforated plates located at different positions from the lower perforated plate, so that the mixed treatment liquids are sprayed through the spray hole more stably.

The present disclosure may be modified in various ways and may have several exemplary embodiments. It is therefore intended that the scope of the disclosure be limited not by this detailed description, but rather by the claims appended hereto, and it should be understood that the disclosure covers all the modifications, equivalents, and replacements within the idea and technical scope of the disclosure.

What is claimed is:

1. A treatment liquid spray nozzle comprising:

a body having a mixing space portion formed therein to mix a first treatment liquid and a second treatment liquid, a first inlet formed on top of the body in such a way as to communicate with the mixing space portion to allow the first treatment liquid to flow into the mixing space portion, a second inlet formed on a side peripheral surface of the body in such a way as to communicate with the mixing space portion to allow the second treatment liquid to flow into the mixing space portion, and a spray hole formed on the a bottom of the body in such a way as to communicate with the mixing space portion; and a rotational flow guiding part disposed in the mixing space portion in such a way as to allow both ends of the rotational flow guiding part to face the first inlet and the spray hole respectively and having a spiral guide with a spiral groove formed on an outer peripheral surface of the rotational flow guiding part, wherein an upper perforated plate is disposed above the spiral guide to be coupled with an inner peripheral surface of the mixing space portion, and one or more lower perforated plates are disposed below the spiral guide to be coupled with the inner peripheral surface of the mixing space portion, wherein cross-sectional area of the mixing space portion in which the lower perforated plate is installed is formed smaller than cross-sectional area of the mixing space portion in which the upper perforated plate is installed, and the second inlet is arranged horizontally below the upper perforated plate and is arranged along the tangential line of the inner peripheral surface of the mixing space portion.

2. The treatment liquid spray nozzle according to claim 1, wherein the spiral guide has a circular cross-sectional shape, while having a tapered shape becoming narrower from an upper portion toward a lower portion of the spiral guide.

3. The treatment liquid spray nozzle according to claim 1, wherein one or more lower perforated plates are located under the spiral guide, and cross-sectional area of the mixing space portion where the lower perforated plates are located are smaller than cross-sectional area of the mixing space portion where the upper perforated plate is located.

4. The treatment liquid spray nozzle according to claim 1, wherein the rotational flow guiding part further comprises a top coupling bar extending upward from top of the spiral guide in such a way as to be coupled to the upper perforated plate.

5. The treatment liquid spray nozzle according to claim 1, wherein the rotational flow guiding part further comprises a bottom coupling bar extending downward from the underside of the spiral guide in such a way as to be coupled to at least one of the lower perforated plates.

6. The treatment liquid spray nozzle according to claim 4, wherein upper part of the top coupling bar faces the first inlet and has cross-sectional area that gradually decreases upward.

7. The treatment liquid spray nozzle according to claim 1, wherein the body comprises:

a mixing body having the mixing space portion formed in the mixing body and a top opening and a bottom opening formed on top and bottom of the mixing body respectively in such a way as to communicate with the mixing space portion;

an upper cover detachably coupled to the top opening and having the first inlet penetrating up and down into the upper cover; and a lower cover detachably coupled to the bottom opening and having the spray hole penetrating into the lower cover.

8. The treatment liquid spray nozzle according to claim 7, wherein the mixing body has one or more perforated plates detachably coupled to the mixing body above or under the spiral guide inside the mixing space portion in a transverse direction with respect to the spray direction of the treatment liquids, and the rotational flow guiding part is detachably coupled to at least one of the perforated plates.

9. The treatment liquid spray nozzle according to claim 8, wherein one of the perforated plates is inserted into the bottom opening of the mixing body, and the through holes formed on the perforated plate inserted into the bottom opening are smaller in diameter than the through holes of the perforated plates disposed on different positions from the bottom opening.

* * * * *